Oct. 13, 1925.
J. BRINCIL
1,557,137
SELF LUBRICATING BEARING AND METHOD OF MAKING IT
Filed Jan. 25, 1924
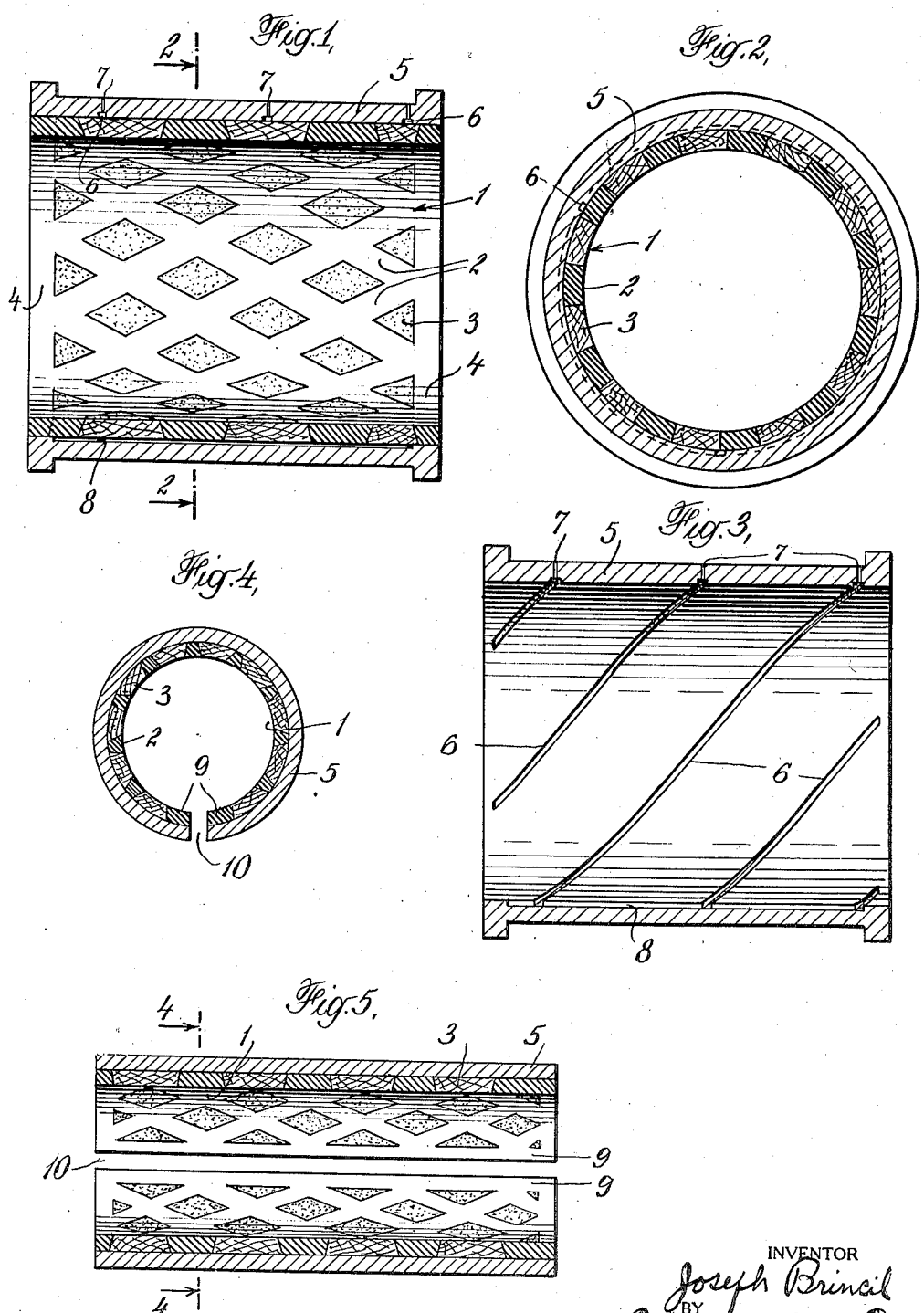
INVENTOR
Joseph Brincil
BY
Pennie, Davis, Marvin Edmonds
ATTORNEY Patented Oct. 13, 1925.

1,557,137

UNITED STATES PATENT OFFICE.

JOSEPH BRINCIL, OF PLAINFIELD, NEW JERSEY, ASSIGNOR OF ONE-HALF TO RALPH CURCIO, OF LINCOLN, NEW JERSEY.

SELF-LUBRICATING BEARING AND METHOD OF MAKING IT.

Application filed January 25, 1924. Serial No. 688,495.

*To all whom it may concern:*

Be it known that I, JOSEPH BRINCIL, a citizen of the United States, residing at 227 Clinton Avenue, Plainfield, in the county of Union, State of New Jersey, have invented certain new and useful Improvements in Self-Lubricating Bearings and Methods of Making Them; and I do hereby declare the following to be a full, clear, and exact description of the invention, such as will enable others skilled in the art to which it appertains to make and use the same.

This invention relates to self-lubricating or so-called "oil-less" bearings of the general type illustrated in U. S. patent to Romano, No. 1,442,445, and has for its object improvements in such bearings and the method of making them.

The bearing of the Romano patent consists of a shell of fibrous material, preferably wood, impregnated with a lubricant, and having a cage of babbitt, or other low-melting bearing metal, imbedded within its inner face. Such a bearing is well adapted for use where the pressure exerted by the journal is relatively light, but where the bearing must sustain heavy loads, as, for example in railroad work, the wood (the outer shell of which must actually bear the load as well as supply the lubricant) has insufficient strength to withstand the heavy duty imposed upon it. One of the improvements of the present invention is the provision of an oil-less bearing of this type in which the wood does not bear the burden of the entire journal pressure but is employed primarily for supplying lubricant. To do this I replace the outer wooden shell of the Romano bearing with a hard metallic shell, so that the Babbitt cage of the bearing rests directly upon this metallic shell, thus relieving the wood of the burden of sustaining the load.

It is obvious that a bearing made in accordance with my invention has considerably less wood in its make-up than a Romano bearing of the same dimensions, and hence has a smaller oil reservoir. In spite of this, however, I have found that for bearings in which the thickness of the Babbitt and wood lining, or bearing proper, is one-eighth of an inch or more, the wood capacity of the wood for absorbing lubricant is sufficient for most uses. For thinner-walled bearings, however, it is advantageous to provide means for replenishing the oil supply without removing the bearing from its setting. I do this by forming oil pockets or grooves in the inner face of the supporting metallic shell which can be filled from the outside and thus supply lubricant to the wooden or absorbent elements of the bearing during use and keep them impregnated.

Other improvements of the present invention relate to the provision of metal ringed ends in bearings of this type, and also the provision of slotted bearings having metal-lined slots.

Now, to replace the outer part of the wooden shell of a Romano bearing with a shell of metal presents difficulties. According to the present invention I have devised a practicable method for doing this, which briefly, consists in removing the outer shell of a bearing made substantially by the Romano method but taking care to slip the outer shell of bronze over the wood and Babbitt lining as soon as the outer shell of wood has been cut to the point where the babbitt is exposed. In this way the isolated wooden portions of the lining are protected and held in place by the bronze shell as soon as they are freed from the wooden shell with which they were integral.

But in order that the entire invention may be made more clear, I shall now refer to the accompanying drawings which illustrate certain preferred embodiments of it. In these drawings, Fig. 1 is a longitudinal section through a bearing constructed in accordance with the present invention showing the Babbitt and wood bearing lining mounted within a metallic shell; Fig. 2 is a transverse section of the bearing taken along line 2—2 of Fig. 1; Fig. 3 is a longitudinal section through the metallic shell itself with the lining removed and showing the oil grooves used in connection with bearings having thin linings; Fig. 4 is a transverse section taken along lines 4—4 of Fig. 5 of a slotted bearing of this type; and Fig. 5 is a longitudinal section through a slotted bearing showing the modification of the lining structure necessary in such a bearing.

Referring first to Figs. 1, 2 and 3, 1 represents the bearing lining and comprises a series of intersecting helical bands or strips 2 of babbitt or other soft low melting alloy commonly employed in this connection. The open spaces between these helical strips of babbitt are filled with pieces of wood 3 or other fibrous material capable of absorbing a lubricant. At either end of the bearing lining, the strips of babbitt terminate in end rings 4 so that no wood is exposed at the ends of the bearings. Surrounding this lining and in direct contact with it is a hard metal shell 5 made preferably of bronze. The inner face of this shell is tinned and is made to coalesce with the strip of babbitt by heating the assembled bearing.

The bearing just described with the wood properly saturated with a suitable lubricant forms a complete self-lubricating bearing, which is adequate for most uses, and because of the fact that the babbitt makes direct contact with the bronze shell, the wood is relieved of the strain of supporting the load carried by the journal, hence can perform the sole function of supplying lubricant, and the frictional heat generated is conducted away from the babbitt directly through the housing. Moreover, the wood of the bearing is in the form of small isolated segments securely locked in position upon which atmospheric moisture has practically no effect.

In the case of bearings having linings less than one-eighth of an inch in thickness, the actual quantity of wood is insufficient to contain a very large quantity of lubricant. In the case of such bearings, therefore, I provide grooves in the inner face of the bronze shell which replenish the lubricant supplied to the wood. The bearing illustrated in Figs. 1, 2 and 3 is provided with such grooves. As most clearly illustrated in Fig. 3, the inner face of the shell 5 is provided with a series of helical grooves 6 of large pitch. These grooves terminate short of the end of the shell so that there can be no leakage of lubricant from their ends, but are provided along the upper face of the shell with a series of oil holes 7 through which a lubricant can be introduced. A longitudinal groove 8 along the bottom of the inner face of the shell connects the various helical grooves, forming a common reservoir for all of them.

In making the bearing illustrated in Figs. 1, 2 and 3, I proceed as follows:—I first take a block of wood having a cylindrical bore and preferably having a cylindrical exterior and cut a series of intersecting helical grooves within its inner face, in the manner illustrated and described in the patent to Romano, or in any other suitable way. I also counter-bore the ends of the wooden cylinder. I then fill these grooves with molten babbitt, or other suitable bearing metal, preferably as illustrated in the Romano patent, and after the metal has set, ream the bore of the metal lined block to approximately the proper size. The next step is to remove the outer shell of wood and replace it with the shell of bronze. To do this, I place the block in a lathe either by mounting it upon a mandrel or holding it within a chuck. The outer wood is then turned off. As the last cut is made and the babbitt is exposed, I slide the bronze shell over the lining closely following the tool. In this way, the small inserts or blocks of wood 3 are covered by the shell 5 as soon as they are actually severed from the outer portion of the wood, and hence cannot fly out under the centrifugal force of the lathe which otherwise would fling them to the far corners of the shop. The shell 5 is tinned on its inner face before being slipped over the lining and thus by heating the assembled bearing, the babbitt of the lining coalesces with the tinned surface of the shell and forms a unitary whole.

By virtue of the form of the helical grooves cut in the wooden block, the babbitt which is cast therein slightly overhangs the adjacent wood so that in the assembled bearing it is impossible for the wooden blocks 3 to move inwardly, and, the shell preventing their moving outwardly, they are securely and permanently locked in place. If it should be found desirable, the helical grooves can be cut with tapered sides as illustrated more clearly in Fig. 4, thus forming an even more secure lock for the wood.

It is practically impossible to slot a bearing such as shown in the Romano patent because the outer shell of wood will crack when subjected to the expansion or contraction to which a slotted bearing is necessarily subjected. It is, however, quite possible to make a slotted bearing of the type illustrated herein without placing any strain upon the wood. To make such a bearing, however, it is necessary to do more than merely slot the shell longitudinally because in doing so the slot would necessarily pass through a number of the small detached wooden blocks, and this would not only tend to weaken the bearing but might cause the cut blocks to fall from their places. Accordingly, when a slotted bearing is to be made, I provide a longitudinal strip of babbitt 9 (see Figs. 4 and 5) through which the slot 10 can be cut without exposing any of the wood.

The action of self-lubricating bearings of this type is well understood and need not be described here. In impregnating the wood with the lubricant, I may take the bearing after the babbitt has been cast but before the outer shell has been removed, or I may take the finished bearing with the bronze shell in place, and soak it in a lubricating bath. In any event, I have found it advisable to soak the bearing in lubricant after completion because the heat necessary to coalesce the tin lining of the copper shell and the babbitt sometimes drives off a small quantity of the absorbed lubricant. It is also obvious that after the outer shell has been fixed in shape and the bearing is otherwise complete, it may be advisable to ream it to size or subject it to any of the finishing operations common in the art.

I claim:

1. A self-lubricating bearing comprising a lining of soft bearing metal and wood impregnated with a lubricant, and an outer shell of a harder metal in direct contact with the soft bearing metal and soldered thereto.

2. A self-lubricating bearing comprising a lining of soft bearing metal and wood impregnated with a lubricant, an outer shell of a harder metal in direct contact with the soft bearing metal, and means for supplying lubricant to the wood during use.

3. A self-lubricating bearing comprising a lining of soft bearing metal and wood impregnated with a lubricant, an outer shell of a harder metal in direct contact with the soft bearing metal, and grooves in the inner face of the metal shell for conducting lubricant to the wood.

4. A self-lubricating bearing comprising a lining of soft bearing metal and wood impregnated with a lubricant, an outer shell of a harder metal in direct contact with the soft bearing metal, helical grooves in the inner face of the metal shell for conducting lubricant to the wood, holes passing through the upper side of the harder metal shell through which lubricant can be introduced into the helical grooves, and a longitudinal groove at the bottom of the harder metal shell connecting the helical grooves.

5. A bearing such as claimed in claim 8, in which the helical grooves and the longitudinal groove stop short of the ends of the bearing.

6. A slotted self-lubricating bearing comprising a lining of a soft bearing metal such as babbitt and a fibrous material such as wood impregnated with a lubricant, and an outer shell of a harder metal such as bronze in direct contact with the soft bearing metal, the slot through the lining being faced with soft bearing metal alone.

7. A slotted self-lubricating bearing lined with a cage comprising intersecting helical bands of soft bearing metal, and a longitudinal strip of soft bearing metal through which a slot is cut, the strips of soft bearing metal holding between them strips of wood impregnated with lubricant and having an outer shell of a harder metal in direct contact with the soft bearing metal.

8. The method of making a self-lubricating bearing having a lining of soft bearing metal and wood designed to be impregnated with lubricant, and an outer shell of a harder metal in direct contact with the soft bearing metal, which comprises forming grooves in the inner face of a cylindrically bored block of wood, casting strips of soft bearing metal in said grooves, removing the outer wood beyond the soft bearing metal, replacing it with a shell of a harder metal, tinned on its inner face, and heating the shell to cause its tinned face to coalesce with the soft bearing metal.

9. The method of making a self-lubricating bearing which comprises cutting helical grooves in the inner face of a cylindrically bored block of wood and circular counter-bored grooves at the ends thereof, and filling said grooves with a soft bearing metal.

10. A self-lubricating bearing having a bearing surface comprising strips of a soft bearing metal and wood impregnated with a lubricant, the strips of bearing metal terminating in a ring of such metal.

11. A self-lubricating bearing having a bearing surface comprising intersecting helical strips of a soft bearing metal and wood impregnated with a lubricant, the helical strips of bearing metal terminating in a ring of such metal.

In testimony whereof I affix my signature.

J. BRINCIL.